(No Model.)
M. CRANFORD.
NUT LOCK.
No. 287,003. Patented Oct. 23, 1883.
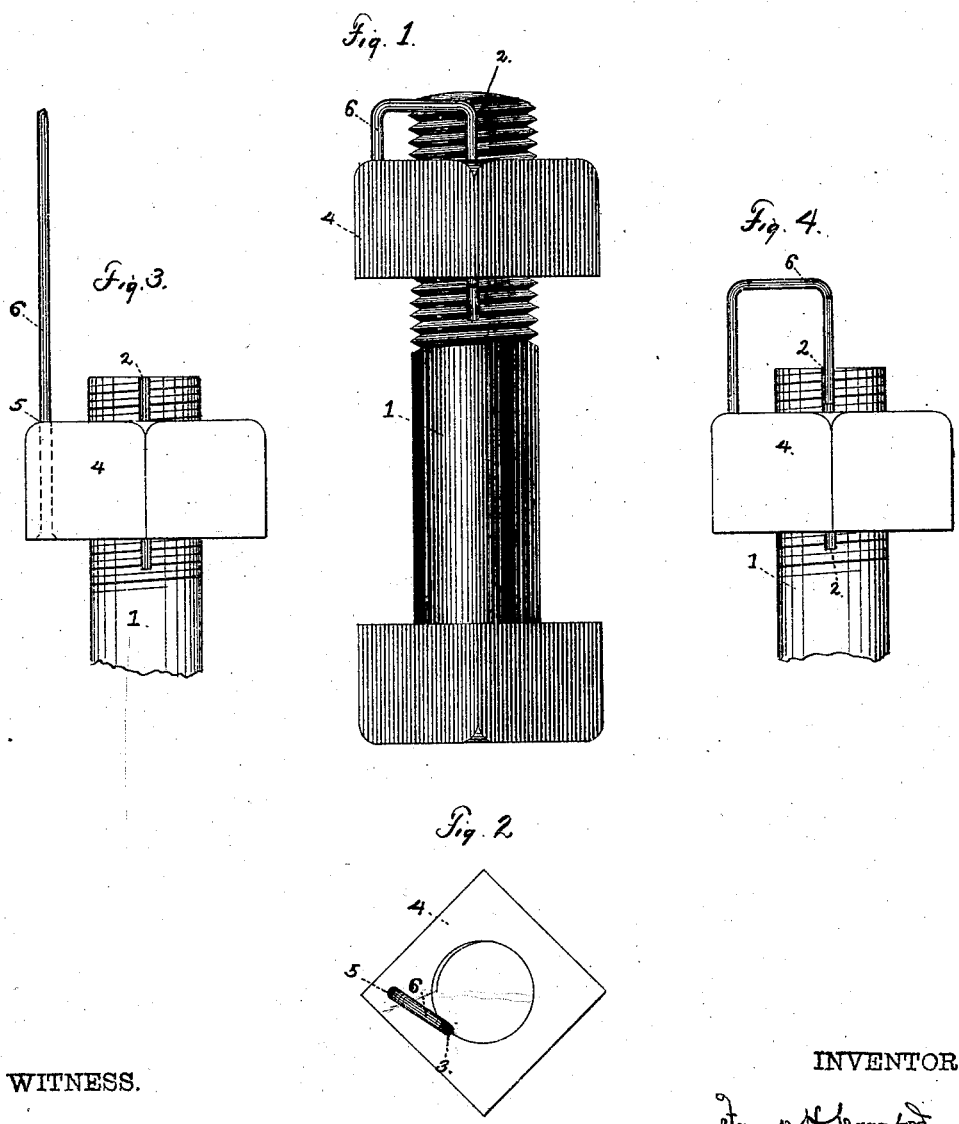
WITNESS.
Geo. A. Dickson
J. L. Taggard
INVENTOR.
Frank H. Cranford
by his Attorney.

UNITED STATES PATENT OFFICE.

FRANK H. CRANFORD, OF REDDING, CALIFORNIA.

NUT-LOCK.

SPECIFICATION forming part of Letters Patent No. 287,003, dated October 23, 1883.

Application filed August 18, 1883. (No model.)

*To all whom it may concern:*

Be it known that I, FRANK H. CRANFORD, a citizen of the United States, residing at Redding, Shasta county, State of California, have made and invented certain new and useful Improvements in Nut-Locks for Screw-Bolts, of which the following is a specification.

My invention relates to devices for fixing nuts upon screw-bolts, to prevent their turning back and working loose on the bolts. The object sought to be attained is to provide a simple, inexpensive, and effective locking device capable of being applied to bolts and nuts already in existence.

To such end my invention consists in forming a notch or groove along the body of the bolt across the threads and a similar groove or notch through the aperture in the threads of the nut, and then combining and connecting with and to the nut a flexible wire pin of such character that after the nut is placed upon and screwed down for the required distance upon its bolt the end of the locking-pin may be bent over and forced down into the space afforded between the nut and the body of the bolt by the coincidence of the grooves in these parts, and thus prevent the nut from turning back upon the threads, the other end of the pin being fixed into the body of the nut.

The following description fully explains the manner in which I proceed to construct, produce, and apply my said invention, the accompanying drawings, forming a part of this specification, being referred to by figures and letters.

Figures 1 and 2 are respectively an elevation and a top view of a bolt having its nut secured by my improved locking device. Figs. 3 and 4 illustrate the manner of working the fastening.

The body of the bolt 1 has a groove or slot, 2, running longitudinally across the threads and from the end toward the head. A similar groove, 3, is formed through the aperture of the nut 4, extending in like manner across the threads, and entirely through from end to end of the opening. At some point in the body of the nut outside of the threaded opening is formed a hole or socket, 5, into which one end of a length of wire, 6, is fixed, the other end being left to project above the head of the nut a sufficient length to be bent over into a U shape. Such nut being placed upon the grooved bolt, it is screwed down into place, and the two grooves 2 3 are brought into line, when, by means of a pair of pliers or a suitable tool for the purpose, the wire 6 is bent over upon itself to bring the end down and in line with the groove or space between the bolt and the nut. A few blows upon the top of the loop or bend thus formed serves to force the end of the wire down into this groove, and the nut is securely locked.

The wire used for the locking-pin should be sufficiently flexible and pliable to stand bending and driving, as it is required also to bend up and straighten the free end in loosening and taking off the nut. Permanent attachment of the locking-pin to its nut is made by heading or upsetting the end of the wire after it is inserted in the socket 5 in the nut.

To bring the two grooves 2 3 into alignment, it may be necessary in some cases to use washers under the nut; or several grooves may be provided in the side of the nut, of which one will register with the groove of the bolt when the nut is turned down into place.

As thus constructed this locking device is readily brought into service, and as readily drawn out of engagement with the bolt to release the nut.

Having thus fully described my invention, what I claim, and desire to secure by Letters Patent, is—

1. A locking device for nuts of screw-bolts, consisting of a groove along the body of the bolt, a groove in the aperture of the nut, and a pliable wire locking-pin having one end fixed in a socket in the body of the nut, and the other end left free to be bent over and forced into the space partly within the bolt and partly within its nut that is formed by aligning said grooves, substantially as described.

2. The combination, with a nut having the groove 3, of a bolt having a groove, 2, and a locking-pin, 6, having one end fast in the nut, and the other end free to be bent over for engagement with the groove in the bolt, as described.

In witness whereof I hereunto set my hand.

FRANK H. CRANFORD.

Witnesses:
G. W. EMERSON,
EDWARD E. OSBORN.